United States Patent [19]

Wilen

[11] Patent Number: 5,015,319

[45] **Date of Patent: * May 14, 1991**

[54] PROGRAMMABLE RACK AND SYSTEM FOR MAKING SAME

[76] Inventor: Richard Wilen, 8 Roxbury Ct., Oakdale, N.Y. 11769

[*] Notice: The portion of the term of this patent subsequent to Apr. 25, 2006 has been disclaimed.

[21] Appl. No.: 79,597

[22] Filed: Jul. 30, 1987

[51] Int. Cl.[5] ........................ B32B 31/00; B32B 3/00; G09F 19/00

[52] U.S. Cl. .................................... 156/227; 156/256; 40/537; 428/136; 428/203

[58] Field of Search ............... 156/227, 226, 250, 256; 40/159, 10 D, 122, 405, 536, 537; 428/136, 138, 201, 203

[56] References Cited

U.S. PATENT DOCUMENTS

| | | | |
|---|---|---|---|
| 577,998 | 3/1897 | Wolsieffer | 40/537 |
| 1,320,683 | 11/1919 | Goodhue | 40/537 |
| 2,305,443 | 12/1942 | Pinto | 40/537 |
| 3,850,083 | 11/1974 | Falcon | 156/227 |
| 3,869,820 | 3/1975 | Holson | 40/537 |
| 4,199,630 | 4/1980 | Cousiglio | 156/227 |
| 4,824,503 | 4/1989 | Wilen | 156/277 |

*Primary Examiner*—Michael W. Ball
*Assistant Examiner*—Louis Falasco
*Attorney, Agent, or Firm*—Stephen E. Feldman

[57] ABSTRACT

An in-line processing system for processing a supply of paper into a disposible programmable rack or organizer is provided. The processing system may be integrated into a publishing or assembly system for making a magazine or other booklet from a paper supply. Paper is processed into a programmable organizer by laying down a pattern of adhesive stripes on the surface of the paper and by cutting a pattern of slits in the paper and then folding the paper over itself forming a two-ply sheet held together by the adhesive stripes and defining longitudinal pockets across the two-ply sheet. The pattern of slits form openings in the pockets. A programmable rack may be made as a unit or may be integrated into a magazine.

8 Claims, 4 Drawing Sheets

PROGRAMMABLE RACK AND SYSTEM FOR MAKING SAME

BACKGROUND OF THE INVENTION

The claims of this patent are hereby dedicated to the public on Apr. 25, 2006.

The present invention relates to disposible organizers or programmable racks useful in organizing a personal television presentation schedule, without limitation thereto, and a system for assembling or making the same.

In the past, prior to the days of home television, radio was a popular home entertainment. Radio programs were published daily in the local daily news paper. There were relatively few radio stations in a given area and in some areas there were sometimes only one or two radio stations receivable on radio appliances sold in the stores. Radio programs were seldom repeated since most radio was live broadcasting. If a particular radio broadcast were aired at a time which was inconvenient to a person that person usually missed the presentation. Except for music, much of which was pre-recorded and played over the air, "electrical-transcriptions", as they were referred to, were not too often used.

With the advent of home television broadcasting there were again only a very limited number of television broadcasting stations in a particular area and, for the most part television broadcast programs were relatively simple. Again, if a certain television presentation were aired at an inconvenient time to an individual the presentation was usually missed by such individual unless the program was repeated or replayed at some other time which was more convenient to the particular individual.

Unlike radio, which was not widely cablized, cable television was introduced to the general public and a great number of broadcasting stations, popularly referred to as channels, were made available to the public throughout the country.

With the great increase in the number of channels available for viewing in almost all parts of the country, with the strong competition among the television channels for "capturing the audience", and television broadcasting around the clock, television stations began repeating presentations, especially popular events and movies shown over television so as to make presentation of such event or popular movies at different, more convenient hours of the day and days of the week. For example, the same television presentation may be shown on several different channels, each showing at a different hour of the day and some showings on the same day of the week while other showings are on different days of the week.

This made daily television programs a complex program to present to the public. Television program guides covering an entire month were published but since these too were based on a daily presentation it was difficult to determine when repeat or replayed presentations were scheduled to be aired.

My copending patent application Ser. No. 078,119, now U.S. Pat. No. 4,815,225 filed July 27, 1987, now Patent Date: Mar. 28, 1989 entitled Programming Device teaches a programmable calender in which stamps identifying television presentations are stored in storage pockets of a transparent sheet. The transparent sheet is a flip sheet located between mirror images of a calander. Rather than present a program on a daily basis a panel of cut-out or tear-out stamps is provided with the stamp clearly identifying the presentation, such as a movie, sports event or other presentation on one side of the stamp and the schedule or times the presentation, in both day and hour, is to be presented and the channel or channels over which presentations are to be aired on the other side. By removing the stamp from the panel and placing the stamp in a storage pocket of the transparent sheet corresponding to a date on which the program is to be presented over the air, a person can organize his personal television viewing schedule. By flipping the transparent sheet back and forth both the front and the back of the stamp may be seen against the same day/-date indication on the mirror image calender. My said application, although teaching a convenient personal television schedule organizer, teaches a device that is made of several different materials and is relatively expensive to make.

SUMMARY OF THE INVENTION

The present invention discloses a novel organizer device made using a novel, inexpensive, in-line paper processing system. The novel programmable device may be made in book form and/or integrated into a book, magazine, catalog or program or may be constructed as single unit organizer.

The system for making the device or processing the paper into the programmable device may be integrated into a magazine, catalog, booklet or other publishing line.

The programmable device may be made from a single sheet of paper which is processed and folded over itself to form a plurality of longitudinal pockets or storage racks or the programmable organizer may be made from two sheets of paper that are each processed and combined to form a plurality of longitudinal pockets or storage racks.

When a single sheet of paper is used to make a programmable device or rack, a pattern of glue stripes is layed down on the surface of one portion of the sheet and a pattern of slits is cut in another corresponding portion of the sheet. When using a single sheet or running sheet to make the programmable rack both processed portions are essentially corresponding to each other with respect to size and shape. The portion of the sheet containing the glue stripe pattern and the portion of the sheet containing the slit pattern are combined so as to form a two element sheet held together by stripes of glue between the sheets.

The pattern of glue stripes layed down of the first portion of the sheet and pattern of slits cut into the second portion of the sheet are so located that the slits are offset from associated glue stripes. When the two portions of the sheet are combined surface to surface, such as the single sheet being folded over itself. The two portions are held or adhered together by the glue stripes but the slits cut into the second portion, being offset from the associated glue stripes form openings into longitudinal pockets or rack extending across the surface of the double sheeted programmable organizer.

The programmable device or rack is made inexpensively, out of an inexpensive paper. During processing the sheet of paper may be printed upon and a calender may be layed out or printed on the surface of the paper which will be exposed after the combining step is accomplished. Calender dates and days of the week may be located on the racks or pockets therein so as to form a calender rack for storing stamps, such as television stamps identifying particular television presentations for the particular day and dates.

When using two sheets of paper to form a programmable organizer both sheets are preferably substantially the same size and shape. One of the sheets has layed down on the surface thereof, a pattern of glue stripes. The other sheet has cut in the surface thereof, a pattern of slits, the slits being offset from corresponding glue stripes. The two sheets are combined, surface to surface and held together by the glue stripes such that pockets are formed between adjacent glue stripe and the slits form openings in the pockets forming longitudinal racks across the combined sheets.

It will be appreciated that the disposeble programmable arganzer may be process in blank so that dates and/or days may be added or placed thereon at some later time.

DETAILED DESCRIPTION OF THE INVENTION

Figure 1:
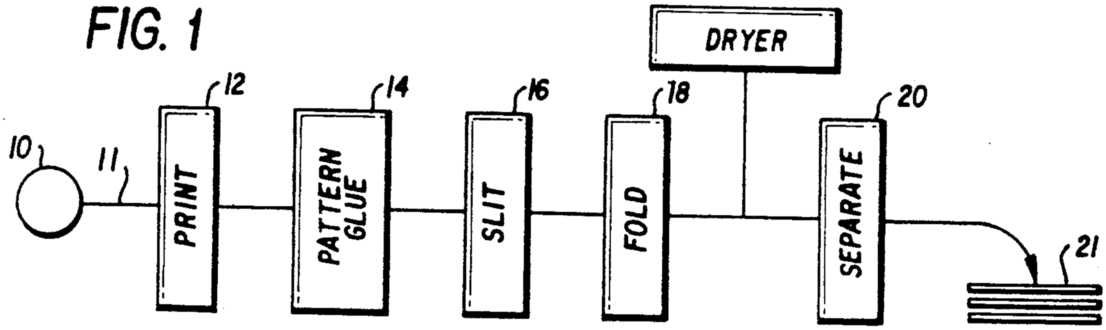
FIG. 1 is a block diagram representing a system for producing a programmable organizer from a roll supply.

Referring to FIG. 1, a block diagram of a system is represented, the various stages of which include apparatus for processing a running sheet from a supply roll 10. The supply may be paper or any material which may be printed, glued, slit and folded to make the product, i.e., a programmable organizer or rack. Hereinafter the term "paper" will be used as including any material usable in the supply, such as plastic, cloth or any other material that may be used to form the programmable organizer.

In processing a running sheet of paper, the paper progressively advances from one stage to the next and a portion of the running sheet is processed by the stage. After the portion of the running sheet is processed in the first stage, the sheet is advanced so that the portion of the sheet processed enters the next stage and a new portion of the running sheet enters the first stage and is processed. When the first portion exits from the last stage of the paper processing system the final product appears and a number of portions of the running sheet of paper, equal to the number of stages in the processing system, are in various stage of completion.

Figure 3:
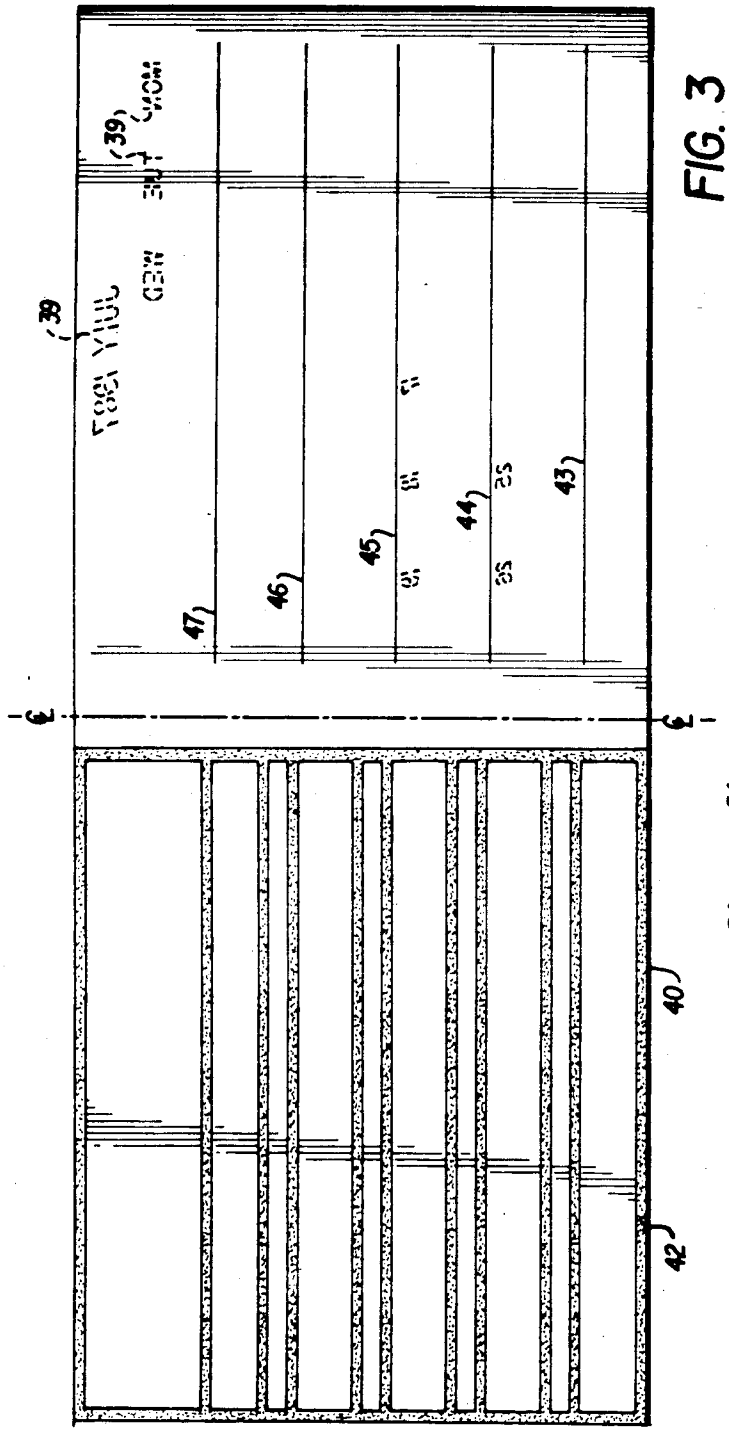
FIG. 3 is a representation of a processed sheet used for forming a monthly programmable organizer.

In the system represented by the block diagram in FIG. 1, a paper supply is represented by the roll 10. The running sheet 11 enters the printing stage 12 which may include an off-set printing press that prints predetermined data on a portion of the running sheet. The sheet advances to the next stage 14 which includes a pattern gluer which lays down a pattern of glue in stripes or ribbons, on one part of the portion of the paper. As seen in FIG. 3, the printer may print on one side of the sheet and the pattern of glue stripes or ribbons may be layed down on the other side of the sheet, on a different part of the same portion of the sheet.

The running sheet advances to the next stage which includes a disk cutter or paper slitting apparatus 16 which cuts a pattern of slits in the paper portion in a precise pattern and location, relative to the pattern of glue stripes. The running sheet advances to the next stage which includes a paper folder 18 which folds that portion of the running sheet being processed, over itself such that the glue stripes are on the inside of the folded sheet and the printing is on the outside. A dryer may also be incorporated at this stage. The running sheet now with its processed portion in a folded state advances to the separater 20 which may be a disk cutter, which separates the processed portion from the running sheet and the finish product is deposited at 21.

Figure 2:
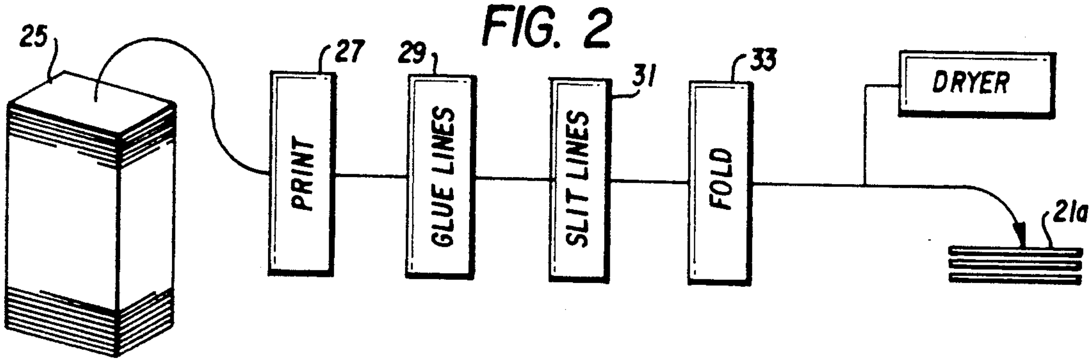
FIG. 2 is a block diagram representing a system for producing a programmable organizer from a single sheet supply.

FIG. 2 represents in block diagram an alternate system for making a programmable organizer in which the paper supply is in the form of separate sheets of paper 25. Where the supply is in the form of individual sheets of paper, single sheets are differentiated or separated from the supply or stack one at a time and each sheet is fed into the system to be processed by the apparatus in the various stages of the process. The sheet would enter the system one at a time and be passed through the various stages for processing.

Alternatively, when using a supply of individual sheets, one may process all the sheets of the supply through the first stage then process the sheets through the remaining stages or process all the sheets stage by stage. However, the use of a roll supply is preferred and in-line processing of the running sheet is preferred.

Referring to FIG. 2, a sheet of paper is separated from the stack of sheets 25 and fed into a printer 27 which prints data on the sheet in predetermined portion thereof. The data may be the month and year, days of the week and dates of the days. The printer may be any printer capable of printing the desired data on the paper used. The sheet is then fed to a pattern gluer 29 which lays down a pattern of stripes of adhesive material, such as glue, on to another portion of the sheet. When the sheet exits from the printing stage 27 and enters the glue lines stage 29 a sheet from the supply enters the print stage 27 for processing or printing.

After a pattern of adhesive or glue stripes is layed down on one of the surfaces of the sheet the sheet enters the next stage 31 during which a pattern of slits is cut into the surface of the sheet, the slits being located and positioned relative to the stripes or ribbons of adhesive material already layed down on the surface of the sheet.

If desired the glue lines 29 stage and the slit lines 31 stage may be reversed.

The slit lines are positioned so as to be offset from corresponding stripes or ribbons of adhesive on the sheet.

FIG. 3 illustrates a sheet on which a pattern of stripes of adhesive material has been layed down and in which slits have been cut. It will be noted that the adhesive ribbons are on one portion of the sheet and the slits are cut in another portion of the sheet. It is apparant that both the pattern of adhesive stripes and the pattern of slits could be made in the same portion of the paper, if desired.

Figure 4:
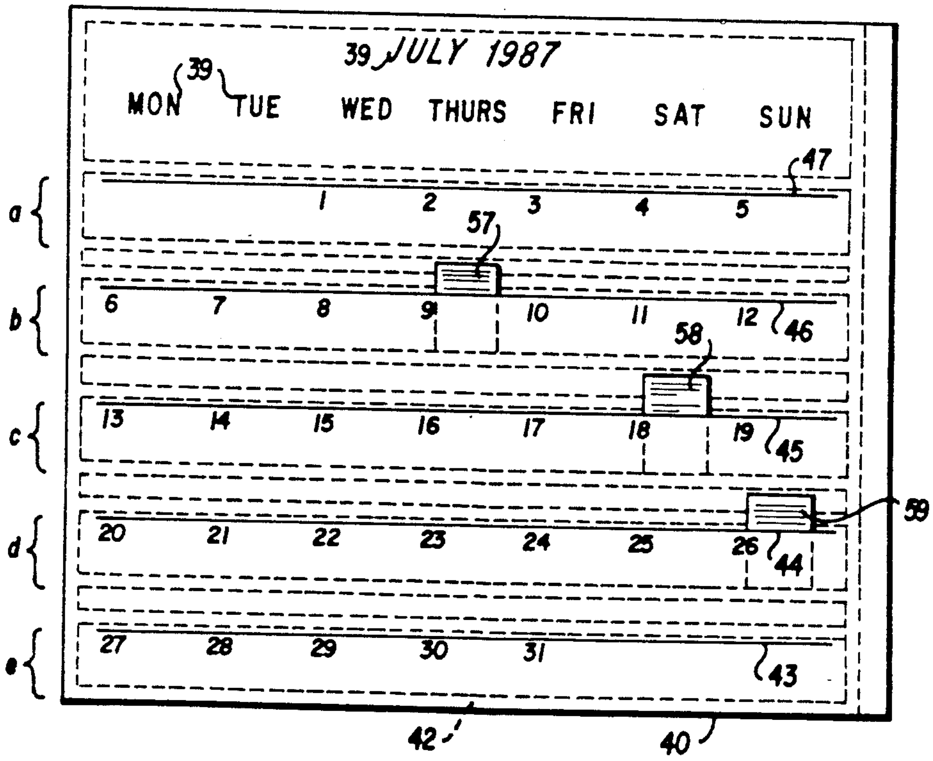
FIG. 4 is a diagramatic representation of a programmable monthly organizer made from the processed sheet represented in FIG. 3.

From the stage 31, slit lines the sheet then is forwarded to the next state 33 to be folded over itself so that the adhesive stripes are in the inside of the folded sheet. As seen in FIG. 3, the sheet 40 would be folded on the center line CL. The pattern or stripes of adhesive will hold the two-ply sheet together, such as seen in FIG. 4 with the printing on the outside. The adhesive or glue pattern 42 is shown on both FIG. 3 and FIG. 4 as hatched lines. The lines 43, 44, 45 46 and 47 call out the slits cut in the paper 40.

The adhesive pattern 42 holds the folded sheet in two ply arrangement and forms pockets a, b, c, d and e. The slits 43, 44, 45, 46 and 47 serve as openings to the pockets into which data may be inserted and removably stored.

Figure 4A:
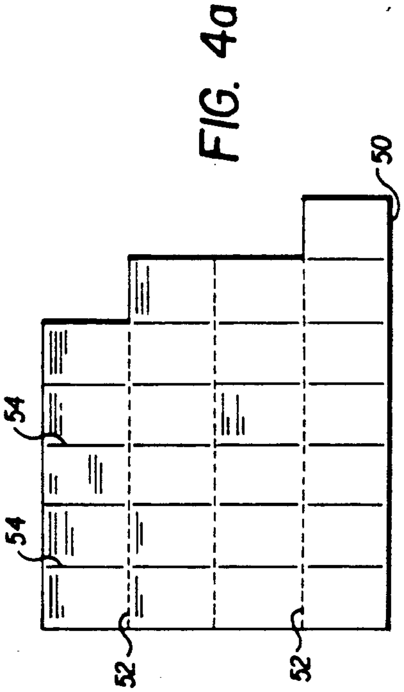
FIG. 4*a* represents a sheet of stamps usable in the programmable organizer.

FIG. 4*a* illustrates a sheet of stamps 50, which may be printed out and processed on a sheet that includes the printed data for the stamp, perforated lines 52 and slits 54, which define the stamps. Stamps 57, 58 and 59 are illustrated inserted in the pockets b, c and d respectively.

The stamps 50, may each identify a different television presentation, for example a movie or sports showing or some other presentation to be shown on different channels and/or on different days of the week and/or at different times of day. The front side of the stamp may identify the presentation and the back side may set forth the schedule of airings. By separating the stamp identifying a presentation, the stamp may be placed in a pocket of the programmable rack or organizer and the elements of a personal programmable television program are provided.

The organizer may be made of very enexpensive material and may thus be disposible.

Figure 5:
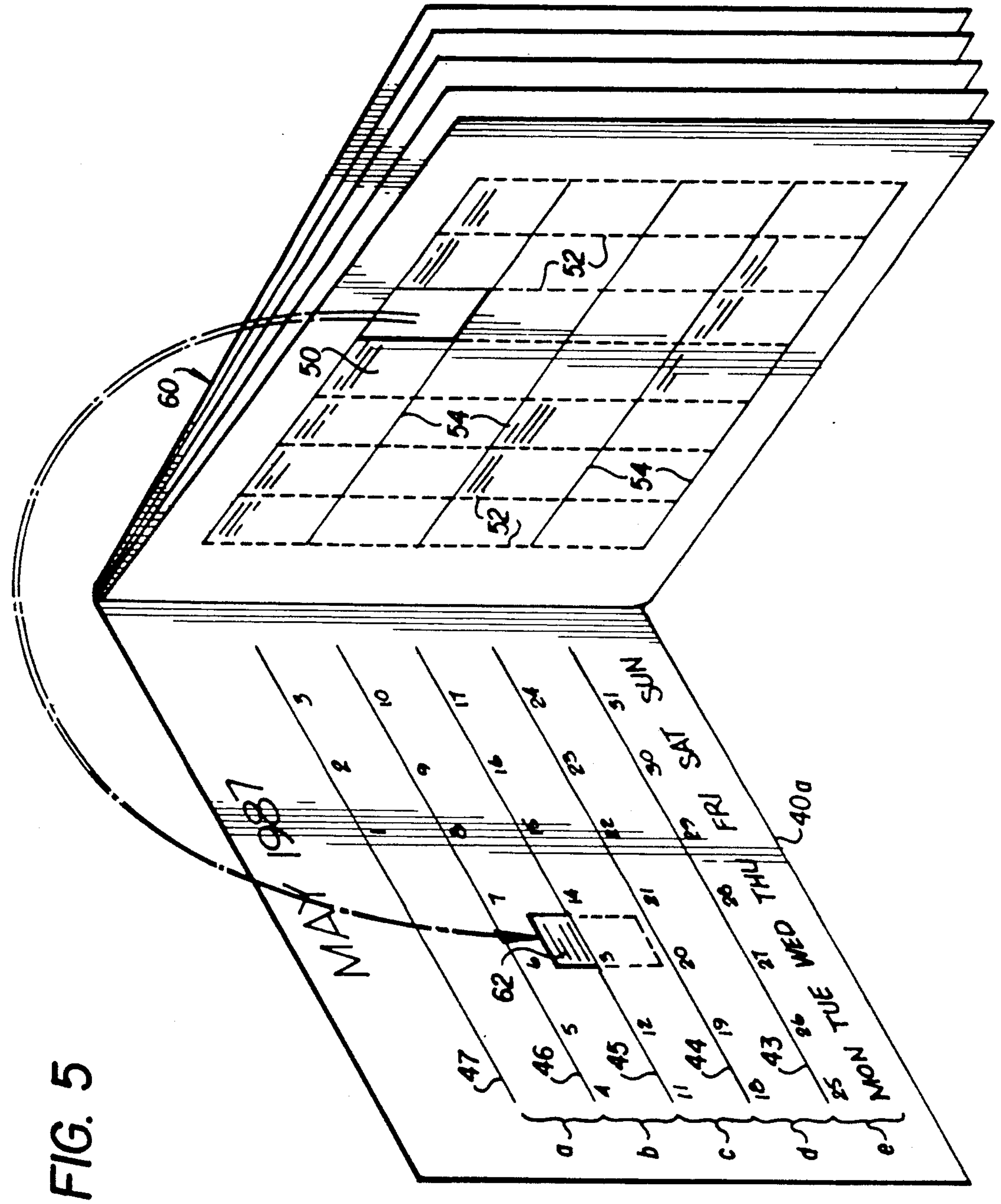
FIG. 5 is a representation of a magazine with a programmable organizer and stamps published as part of the magazine.

In another form the personal programmable television program may be inserted into a magazine or television program booklet, such as seen in FIG. 5. A magazine or other booklet 60 is represented with a page or sheet of stamps 50. Perferated lines are represented at 52 while slits or slit lines are represented at 54. The stamps may be torn out and inserted into the pockets of the programmable rack 40*a* made as part of a magazine. The slits 43, 44, 45, 46 and 47 may form the openings for the pockets a, b, c, d and e respectively. A stamp such as 62 may be removed from the sheet and inserted in the pocket at the appropriate day and date.

It will be appreciated that the assembly system for making the programmable organizer may be inserted or integrated into and become part of an in-line publishing system or line for publishing, that is, printing, folding and assembling a magazine. The programmable rack or organizer may be made and assembled into a magazine along with the pages of the magazine , such as represented in FIG. 5. However, it is apparant that the programmable rack may be placed almost anywhere in the magazine and need not be limited to the inside of the cover sheet, as represented in FIG. 5.

Figure 6:
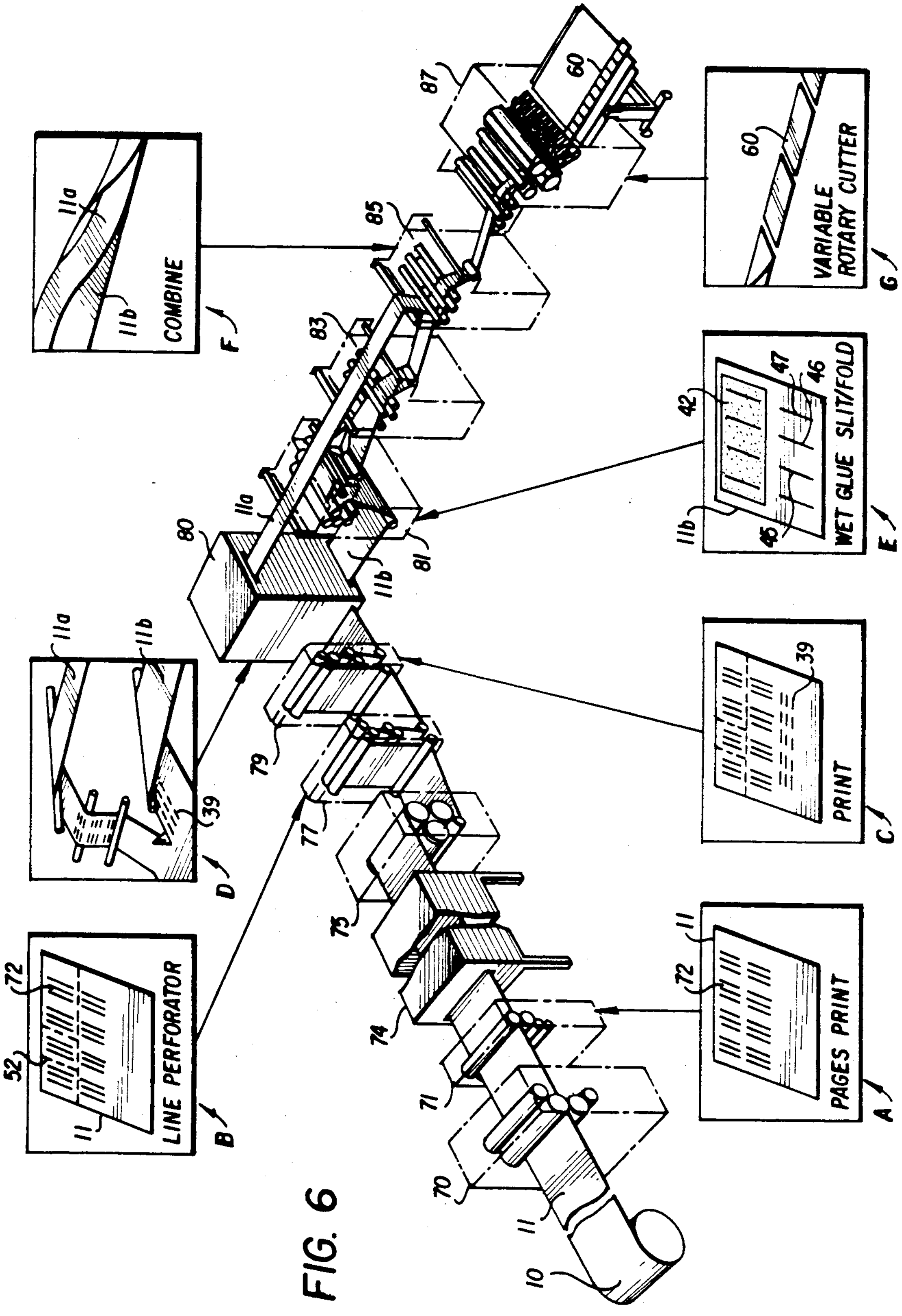
FIG. 6 is a diagramatic representation of a preferred embodiment of an in-line production system for making a programmable organizer and magazine and incorporating the organizer into the magazine.

Turning to FIG. 6 a system is represented , in a preferred form, which is an in-line running sheet processing or publishing system which may print and/or publish and/or assemble a magazine with a programmable rack integrated into the magazine.

A supply of paper 10 is represented in roll form and is fed into one or more printers 70 and 71 which prints pages 72 on the sheet 11. The window A represents the printing at 72 on the running sheet 11. The running sheet passes through a dryer 74 which dries the ink and through chill rolls 75 which cools off the running sheet of paper . A perforator 77 punches or cuts a pattern of perforations in the sheet shown in window B at 52. The perforated lines that provide part of the tear-out feature for stamps, such as seen in FIG. 5. The sheet is fed into an imprinter 79 that may be a computer controlled printer which may print the month and numbers on the sheet for the programmable organizer shown in window C. The running sheet is fed into a paper cutter which cuts the sheet lengthwise into two running sheet 11*a* and 11*b* and inverts and separates the sheets as shown in window D. The sheet 11*b*, on which is printed data for the calander is fed to a web glue pattern device 81 which lays down a pattern of adhesive or glue 42. The wet glue pattern device may also include a slitting capability which cuts slits 45, 46 and 47, for example, in the sheet, the slits being off-set from corresponding glue stripes placed on the sheet as seen at E. Sheet 11*b* is then folded over itself as by a folder 83 forming the double ply, pocketed programmable rack. The sheet 11*a* bypasses the pattern gluer/slit cutter and folder and is fed into a folding device and combiner 85. The sheet 11*a* is folded into the pages of the magazine which includes a sheet of stamps. The sheet 11*b* is also fed into the folder/combiner 85/87 which combines the programmable rack with the other pages of the magazine. The programmable rack may be positioned anywhere in the magazine according to the setting of the folder/combiner 85/87.

The unit 87 also includes a rotary cutter which separates the folded magazine 60, from the running sheet. This is represented in window G.

Thus there has been described a programmable organizer or rack which may be made in disposible form, as a unit or may be made while publishing and/or assembling a magazine so as to be inserted into the magazine. A preferred embodiment of a system for making and assembling a programmable rack and magazine combining such rack has been represented and described.

The various units or apparatus represented in the system described with reference to FIG. 6 such as printing presses 70, 71 and 79 are available from Harris Press Company. The other apparatus such as pattern perforator 77, print dryer 74, chill rolls 75, angle bar and splitter 80, wet pattern gluer slitter 81, rotary cutter 87 and folders 83 and 85 are apparatus that are available from Baldwin Machine Company. Alternate methods and systems for making a programmable rack have also been described and suggested. In addition thereto changes in position of the apparatus in the system may be made and changes in the apparatus may be made as will be apparant to those skilled in the art without departing from the invention defined in the claims.

What is claimed is:

1. A method for making a programmable organizer from a paper supply comprising the steps of:

(a) feeding paper from said paper supply into a printer for printing data thereon;

(b) feeding said paper into a pattern gluer for laying down a pattern of glue stripes on the face of said paper;

(c) feeding said paper into a pattern slitter for cutting a pattern of slits in the surface of said paper, each slit of said pattern of slits being offset from the glue stripes; and (d) folding said paper over itself for forming a two ply sheet of paper held together by said pattern of glue stripes, said pattern of glue stripes forming longitudinal pockets across said two ply sheet, the offset said slits forming openings in said longitudinal pockets.

2. A method as in claim 1 where in said paper supply is roll of paper and step a further includes:

(a) cutting said two ply sheet from said supply for separating said two ply sheet from said supply 3. A method as in claim 1 wherein said paper supply is a stack of sheets of paper step a further include;

(a) separating the sheets from said paper supply one at a time and feeding said sheet one at a time.

4. A method for making a programmable organizer from a paper supply comprising the steps of:

(a) feeding paper from said paper supply into a printer for printing calander information on a surface of said paper;

(b) feeding said paper into a pattern gluer for laying down a pattern of glue stripes on another surface of said paper said pattern of glue stripes forming rectangles on said another surface of said paper;

(c) feeding said paper into a pattern slitter for cutting slits in said paper extending from said surface to said another surface said slits being offset from correspondingly located glue stripes forming at least part of some of said rectangles;

(d) folding said paper over itself, surface to surface for forming a two-ply sheet with said pattern of glue stripes on an inside surface of said two-ply sheet and said two-ply sheet is held together by the glue stripes, and said pattern of glue stripes forms a plurality of pockets across said two-ply sheet, and each slit of said pattern of slits is associated with a pocket of said plurality of pockets for forming an opening in said pocket for storing data therein.

5. A method as in claim 4 and further including the step of:

(a) feeding said two-ply sheet into a cutter for cutting said two-ply sheet from said paper supply.

6. A method for making a magazine and a programmable rack from a paper supply and integrating said programmable rack into said magazine comprising the steps of:

(a) feeding paper from said paper supply into a printer for printing pages of said magazine on a first portion of said paper;

(b) feeding said paper into a pattern gluer for laying down a pattern of glue stripes on a second portion of said paper, said glue stripes defining rectangles on a surface of said paper;

(c) feeding said paper into a pattern slitter for cutting a pattern of slits into the surface of said second portion of said paper, said slits being offset from corresponding glue stripes layed down on said second portion of said paper;

(d) cutting said paper for separating said first portion from said second portion;

(e) folding said first portion of said paper into pages of said magazine;

(f) folding said second portion over itself for forming a two-ply sheet held together by the glue in said pattern of glue stripes for forming pockets, defined by said glue stripes, across said two ply sheet, said slits of said pattern of slits forming openings in said pockets; and (g) combining said pages and said two-ply sheet for forming a magazine.

7. A method for making a magazine as in claim 6 and in which one or more of the printed pages printed in the step (a) comprises a page of stamps and the method further includes, between steps (a) and (b), the step of:

(a) feeding said paper into a perforator for cutting a pattern of perforated lines separating the printed stamps one from the other for making tear-out stamps.

8. A method for making a magazine as in claim 6 and in which one or more of the printed pages printed in step (a) comprise one or more pages of stamps and the method further includes, between steps (a) and (b), the steps of:

(a) feeding said paper into a perforator for cutting a series of perforator lines in said paper in one direction between the stamps printed on said paper; and (b) feeding said paper into a slitter for cutting a series of slits in said paper in a second direction between the stamps printed on said paper for making the stamps tear-out stamps.

* * * * *